(12) United States Patent
Honda et al.

(10) Patent No.: US 8,181,446 B2
(45) Date of Patent: May 22, 2012

(54) EXHAUST EMISSION PURIFICATION APPARATUS FOR ENGINE

(75) Inventors: Koutarou Honda, Ageo (JP); Yuuji Naitou, Ageo (JP); Isamu Kanaya, Ageo (JP); Daisuke Shirai, Yokohama (JP); Hitoshi Hiramoto, Yokohama (JP); Naobumi Yamada, Yokohama (JP)

(73) Assignee: Nissan Diesel Motor Co., Ltd., Kanagawa (JP)

(*) Notice: Subject to any disclaimer, the term of this patent is extended or adjusted under 35 U.S.C. 154(b) by 535 days.

(21) Appl. No.: 11/941,889

(22) Filed: Nov. 16, 2007

(65) Prior Publication Data

US 2008/0072576 A1  Mar. 27, 2008

Related U.S. Application Data

(63) Continuation of application No. PCT/JP2006/309728, filed on May 16, 2006.

(30) Foreign Application Priority Data

May 17, 2005  (JP) ................................. 2005-144380

(51) Int. Cl.
 *F01N 3/00* (2006.01)
(52) U.S. Cl. ................ 60/286; 60/274; 60/295; 60/301; 60/303
(58) Field of Classification Search .................... 60/274, 60/286, 295, 301, 303
See application file for complete search history.

(56) References Cited

U.S. PATENT DOCUMENTS

| | | | | |
|---|---|---|---|---|
| 5,992,141 | A * | 11/1999 | Berriman et al. | 60/274 |
| 6,074,619 | A * | 6/2000 | Schoubye | 423/239.1 |
| 6,601,385 | B2 * | 8/2003 | Verdegan et al. | 60/286 |
| 6,722,124 | B2 * | 4/2004 | Pawson et al. | 60/286 |
| 7,065,958 | B2 * | 6/2006 | Funk et al. | 60/286 |
| 2006/0099088 | A1 | 5/2006 | Nau et al. | |

FOREIGN PATENT DOCUMENTS

| | | |
|---|---|---|
| DE | 201 07 346 U1 | 9/2001 |
| JP | H06-294324 | 10/1994 |
| JP | 09-096212 A | 4/1997 |
| JP | 10-018838 * | 1/1998 |
| JP | 2000-027627 | 1/2000 |
| JP | 2004-044405 | 2/2004 |
| JP | 2005-083276 | 3/2005 |
| WO | WO 2004/004889 A1 | 1/2004 |

* cited by examiner

*Primary Examiner* — Thomas Denion
*Assistant Examiner* — Diem Tran
(74) *Attorney, Agent, or Firm* — McDermott Will & Emery LLP

(57) ABSTRACT

A reduction catalyst is disposed in an exhaust passage of an engine. A reducing agent added to the exhaust gas is urged to react with NOx in the exhaust gas, catalyzed by the reduction catalyst. A member for distributing the exhaust gas to which the reducing agent has been added is provided. This member is formed by applying of an axial welding and is disposed in the exhaust passage such that the internal surface of its joining portion is disposed to overhang from the topmost position of the joining portion.

12 Claims, 5 Drawing Sheets x–x

ABSTRACT # EXHAUST EMISSION PURIFICATION APPARATUS FOR ENGINE

This application is a continuation of PCT/JP2006/309728, filed on May 16, 2006.

BACKGROUND OF THE INVENTION

1. Field of the Invention

The present invention relates to an exhaust emission purification apparatus for an engine, and particularly to a technique that, in an exhaust emission purification apparatus, adds a NOx reducing agent to purify an exhaust gas, for preventing accumulation of the constituents of the reducing agent in the exhaust passage.

2. Description of the Related Art

As an apparatus for purifying nitrogen oxides (hereinafter referred to as "NOx") contained in an exhaust gas of an engine, the following apparatus that uses a NOx reducing agent is known. The apparatus has a reduction catalyst disposed in an exhaust passage of the engine, and in the apparatus, a reducing agent such as a urea aqueous solution is injected by an injection nozzle disposed upstream of the reduction catalyst (Japanese Laid-open (Kokai) Patent Application Publication No. 2000-027627). NOx in the exhaust gas and the injected reducing agent cause a reducing reaction on the reduction catalyst, and therefore the NOx is purified into harmless constituents.

In such an apparatus, for the purpose of injection of the reducing agent, the injection nozzle is disposed to protrude through a tubular wall of the exhaust passage so as to be inserted into the exhaust passage. Therefore, a manufacturing advantage is obtained if the exhaust passage extending between the injection nozzle and the reduction catalyst is formed with an intermediate member separate from the passage member that is located upstream of the injection nozzle. Here, from the viewpoint of manufacturing economy and convenience, it is preferable to adopt a joining method in which the intermediate member is formed by welding to define an intermediate passage. Namely, a flat plate is employed as a base material of the intermediate member. The flat plate is formed by bending into a cylindrical shape and then its opposite edges are joined together by welding.

However, in the method using the welding, a weld bead must be formed in a joining portion in order to ensure joining strength. Accordingly, in the mounted state of the intermediate member in the exhaust passage, the weld bead bulges from the wall surface of the exhaust passage. If no consideration is given to the joining portion so that the joining portion is located in a lower part of the exhaust passage, the reducing agent injected by the injection nozzle is more likely to stay on the bulged weld bead while permitting the constituents of the reducing agent to be deposited on the weld bead due to the exhaust heat and consequently an accumulation of the above-mentioned constituents is formed in the exhaust passage.

SUMMARY OF THE INVENTION

From the above, it is desirable to prevent the reducing agent from readily staying on the weld bead and to suppress any accumulation of the constituents of the reducing agent in the exhaust passage, even in the case where the intermediate member is formed by welding for convenience, etc.

An object of the present invention is to provide an exhaust emission purification apparatus that addresses the problems discussed above.

An exhaust emission purification apparatus according to the present invention includes a reduction catalyst disposed in an exhaust passage of the engine, an addition device that is provided with an injection nozzle disposed in the exhaust passage at a position upstream of the reduction catalyst and injects a NOx reducing agent into the exhaust gas of the engine via the injection nozzle, and a passage member interposed in the exhaust passage that defines at least a part of an internal face of the exhaust passage between the injection nozzle and the reduction catalyst. The passage member includes a joining portion formed by welding in an axial direction of the passage member, and the joining portion is located in a position where the normal line of the internal surface of the passage member that is drawn at the position inclines vertically downward with respect to a horizontal direction extending from the position.

According to the present invention, the joining portion of the passage member is located in a position where the normal line of the wall surface of the exhaust passage formed by this member inclines vertically downward with respect to the horizontal direction. This makes it possible for the action of gravity to prevent the reducing agent injected by the injection nozzle from adhering to the joining portion even if the reducing agent flows as far as the joining portion in contact with the wall surface of the exhaust passage. Accordingly, this prevents the constituents of the reducing agent from depositing on the joining portion and from forming of an accumulation of the constituents of the reducing agent in the exhaust passage.

The other objects and features of the present invention will be better understood from reading the following description with reference to the accompanying drawings.

This application claims the priority based on Japanese Patent Application No. 2005-144380, the entire contents of which are hereby incorporated by reference.

DESCRIPTION OF THE PREFERRED EMBODIMENTS

Referring to the accompanying drawings, embodiments of the present invention will now be described.

Figure 1:
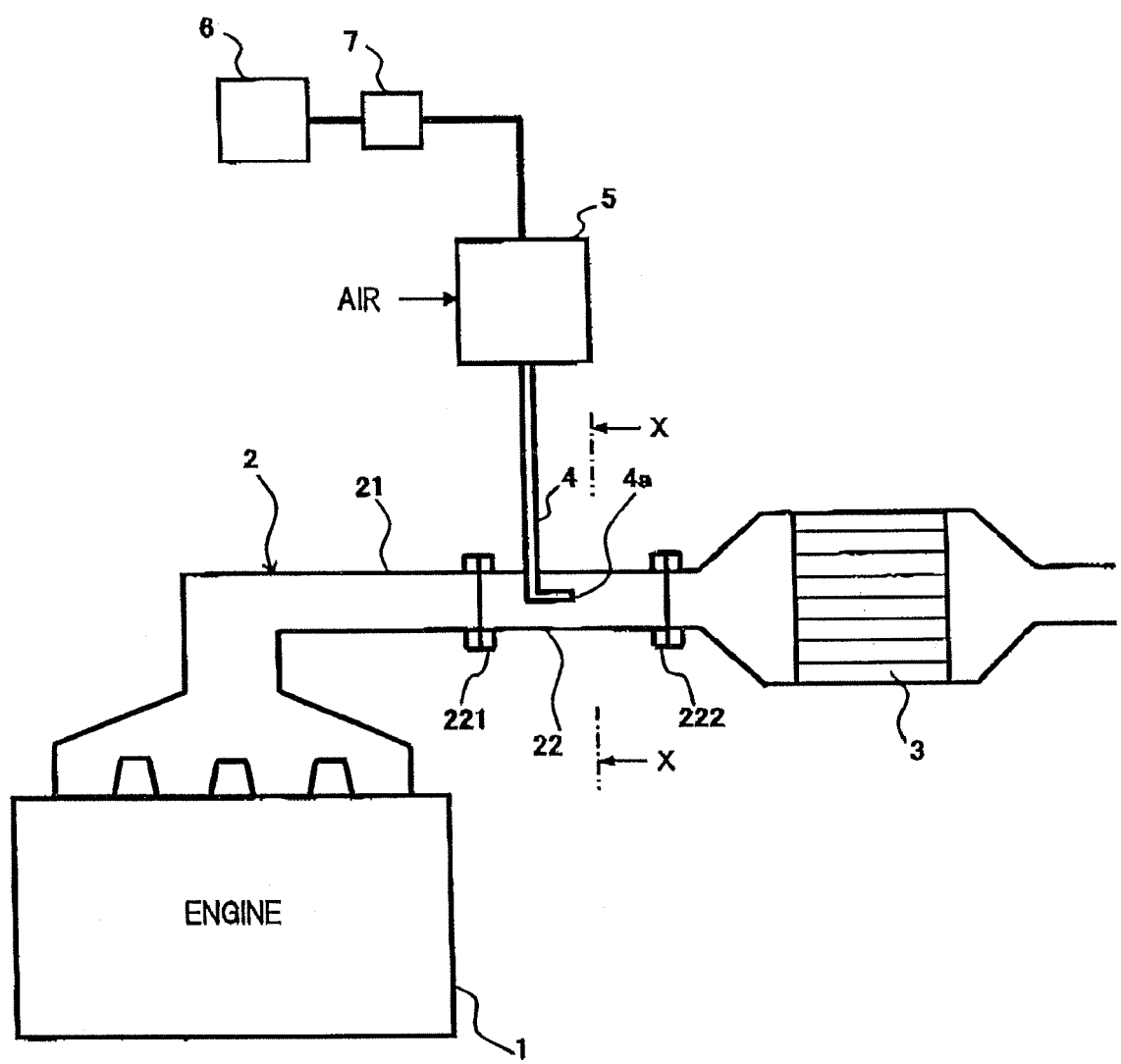
FIG. 1 is a view showing the entire configuration of an exhaust emission purification apparatus for an engine according to a first embodiment of the present invention.

FIG. 1 shows the entire configuration of an exhaust emission purification apparatus for an engine 1 according to a first embodiment of the present invention.

The engine 1 according to the first embodiment is a diesel engine and composes the drive source of a large vehicle such as a truck. In an exhaust passage 2 of the engine 1, a reduction catalyst 3, which accelerates a NOx reducing reaction with a reducing agent (described below), is disposed. The exhaust passage upstream of the reduction catalyst 3 is divided into an upstream exhaust pipe 21 and a downstream exhaust pipe 22.

These exhaust pipes 21 and 22 are coupled by a flange (in FIG. 1, the flange of the downstream exhaust pipe 22 is denoted by reference numeral 221). The downstream exhaust pipe 22 corresponds to "a passage member" according to the first embodiment. The downstream exhaust pipe 22 is connected to a housing or shell for the reduction catalyst 3 by a flange 222, thereby forming an exhaust passage between a reducing agent injection nozzle 4 and the reduction catalyst 3. The injection nozzle 4 is used to inject the NOx reducing agent into exhaust gas. The injection nozzle 4 is inserted in the downstream exhaust pipe 22 by protruding through its pipe wall. An injection hole 4a in the leading end of the injection nozzle 4 opens in the downstream exhaust pipe 22 and the injecting direction of the injection nozzle 4 is oriented toward the end surface of the reduction catalyst 3. The first embodiment utilizes an aqueous solution of urine (hereinafter referred to as a "urea water"), as the NOx reducing agent, which is stored in a urea water tank 6. An injection control unit 5 is provided to control the discharge amount of a urea water from a feed pump 7 so that the urea water with a predetermined flow rate matching the running state of the engine 1 is injected into the exhaust gas. The urea in the injected urea water hydrolyzes due to the exhaust heat, thereby producing ammonia adequate to reduce NOx. An air for assisting injection is supplied to the injection control unit 5 from an air tank (not shown in the figure), the urea water is mixed with the assisting air and the mixture of these is injected into the exhaust gas. An "addition device" according to the first embodiment includes the injection nozzle 4 and the injection control unit 5.

Figure 2:
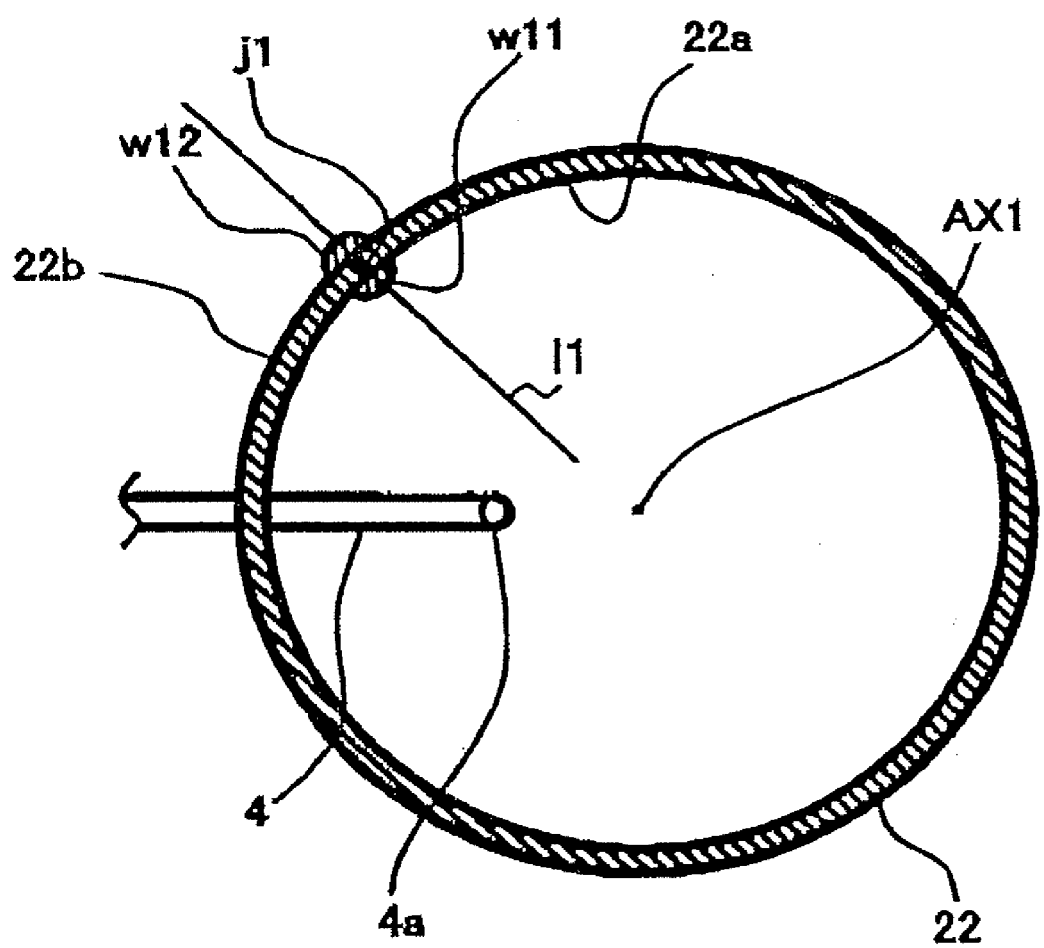
FIG. 2 is a sectional view of a downstream exhaust pipe as a "passage member" according to the first embodiment.

FIG. 2 is a sectional view at the cutting line x-x (in FIG. 1) of the downstream exhaust pipe 22.

The base material of the downstream exhaust pipe 22 is a flat sheet of steel. The downstream exhaust pipe 22 is formed by shaping the steel into a cylinder, and the edges thereof are met and welded in the axial direction. In order to ensure joining strength, weld beads w11 and w12 are formed on an internal surface 22a and an external surface 22b, respectively, of a joining portion j1. In the first embodiment, the joining portion j1 is disposed higher than a central axis AX1 of the downstream exhaust pipe 22 in the implementation state where this pipe 22 is interposed in the exhaust passage 2. In the first embodiment, since the downstream exhaust pipe 22 is cylindrical, the joining portion j1 is disposed in a given position where the internal surface 22a of the downstream exhaust pipe 22 extends to overhang; in other words, where the normal line 11 that is drawn from the given position (i.e., line defining the direction of the internal surface 22a) is arranged to decline vertically downward relative to the horizontal direction defined at that given position. The injection nozzle 4 is inserted into the downstream exhaust pipe 22 in its sidewise direction toward its axis AX1, that is, the substantially horizontal direction.

In the exhaust emission purification apparatus having the foregoing configuration, the injection of the urea water by the injection nozzle 4 causes urea in the urea water to be hydrolyzed due to the exhaust heat and produce ammonia. The produced ammonia is supplied to the reduction catalyst 3 by the flow of exhaust gas, and then subjected to a reducing reaction with NOx in the exhaust gas, thereby converting the NOx into harmless gas. In this case, if part of the injected urea water adheres to the downstream exhaust pipe 22, the urea water creates a wall current along the internal surface 22a of this pipe 22. In the first embodiment, since the joining portion J1 is disposed where the internal surface 22a extends to overhang, the urea water that has fallen as far as the joining portion j1 easily flows over the weld bead w1 by virtue of gravity. This prevents the urea water from staying on the weld bead w1 and reduces deposition of the urea that is a constituent of the reducing agent.

According to the first embodiment, the exhaust passage between the upstream exhaust pipe 21 and the reduction catalyst 3 is formed by the downstream exhaust pipe 22 that is produced as a member separate from and independent of the upstream exhaust pipe 21. This facilitates the installation of the injection nozzle 4 to the exhaust passage 2. In addition, using the flat sheet of steel, which serves as the base material of the downstream exhaust pipe 22, and welding it into a cylindrical shape saves on the production cost of this member 22.

Additionally, according to the first embodiment, the joining portion j1 of the downstream exhaust pipe 22 is disposed where the internal surface 22a of this member 22 extends to overhang in the aforementioned manner, in order that the urea water which has adhered to the internal surface 22a at the upper part than the joining portion j1 and flown down to the joining portion j1 in contact with the internal surface 22a can flow over the weld bead w1 by virtue of gravity. This prevents the reducing agent constituent from depositing in the joining portion j1 and accumulating in the exhaust passage 2.

Next, another embodiment of the present invention will be described.

Figure 3:
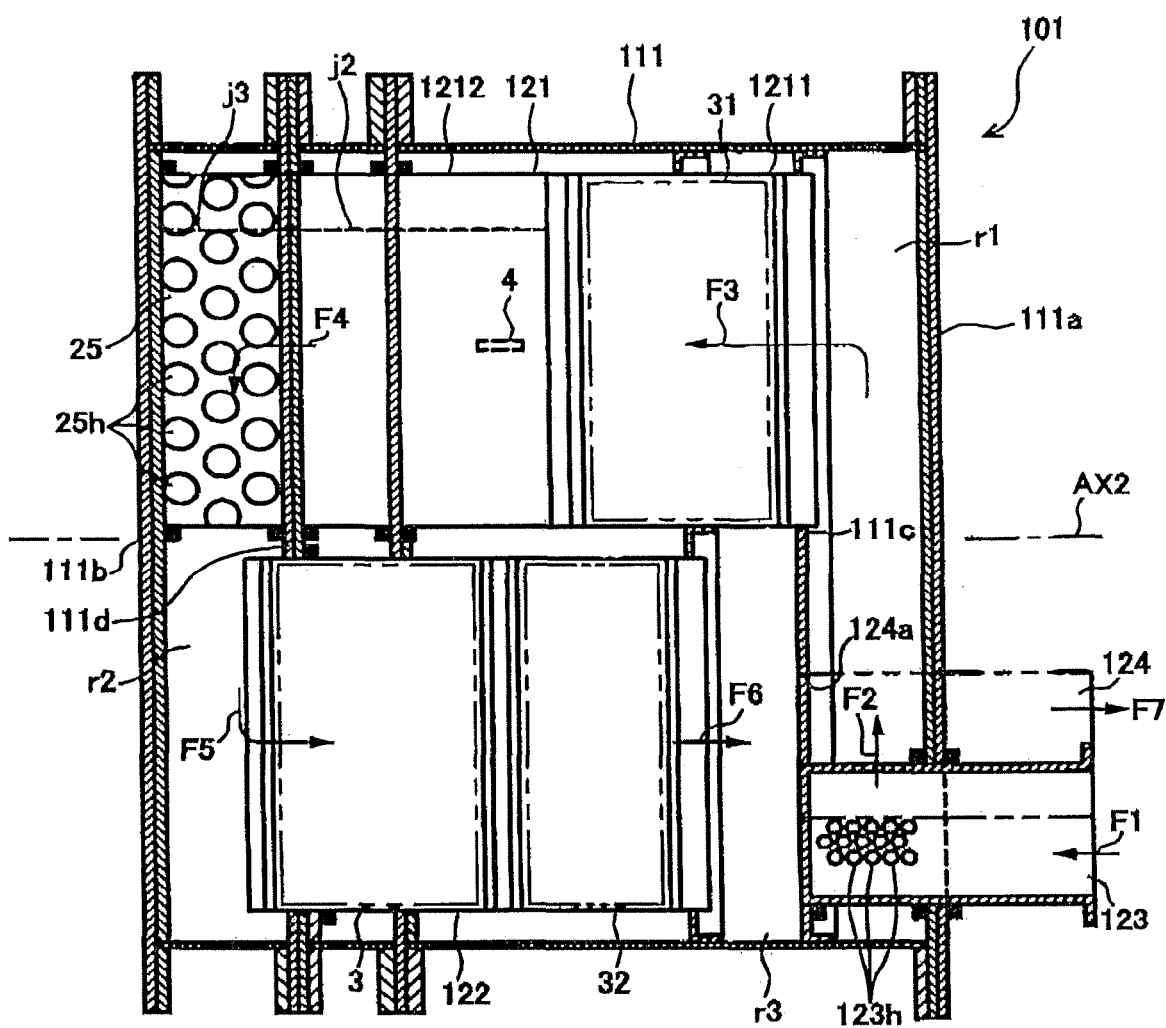
FIG. 3 is a view showing the configuration of an exhaust emission purification apparatus for an engine according to a second embodiment of the present invention.

FIG. 3 shows the configuration of the engine 1 according to a second embodiment of the present invention. In this embodiment, the exhaust emission purification apparatus is configured such that a catalytic muffler 101 functioning as a silencer as well is interposed in the exhaust passage 2.

The exhaust emission purification apparatus according to the second embodiment includes, in addition to the reduction catalyst 3, a first oxidation catalyst 31 and a second oxidation catalyst 32 disposed upstream and downstream, respectively. The first oxidation catalyst 31 converts nitrogen monoxide (hereinafter referred to as "NO") in exhaust gas into NOx containing nitrogen dioxide (hereinafter referred to as "$NO_2$") as its main constituent, thereby adjusting the proportion of NOx in the exhaust gas to be appropriate for the reaction of reducing NOx by the reduction catalyst 3. On the other hand, the second oxidation catalyst 32 is used for oxidizing a reducing agent (called "slip ammonia") that failed to contribute to any reduction of NOx and has passed through the reduction catalyst 3, thus preventing this reducing agent from being eventually exhausted into the atmosphere without being purified.

The catalytic muffler 101 includes a muffler housing 111, serving as a case for the oxidation catalysts 31 and 32 and reduction catalyst 3, and functions as a silencer as well. These catalysts 3, 31 and 32 are accommodated in the muffler housing 111 and installed in a suitable position in the exhaust passage 2. The inside of the muffler housing 111 is divided, by partitions 111c and 111d perpendicular to the axial direction, into an expansion chamber r1 on the side of the front wall 111a, a return chamber r2 on the side of the rear wall 111b, and an intermediate chamber between them. Each of the expansion chamber r1 and return chamber r2 forms the muffling chamber of the catalytic muffler 101: the expansion chamber r1 for "a first muffling chamber", and the return chamber r2 for "a second muffling chamber." In the intermediate chamber are a first catalyst storage cylinder 121 and a second catalyst storage cylinder 122 disposed on the upper and lower sides respectively with respect to the central axis AX2. The expansion chamber r1 and return chamber r2 communicate via the first catalyst storage cylinder 121, and do not communicate via the second catalyst storage cylinder 122.

The second catalyst storage cylinder 122 allows communication of the return chamber r2 and a small chamber r3, which is formed by further dividing the intermediate chamber by a partition perpendicular to the axial direction. The first oxidation catalyst 31 is stored in the first catalyst storage cylinder 121, and the reduction catalyst 3 and second oxidation catalyst 32 in the second catalyst storage cylinder 122.

In the second embodiment, the first catalyst storage cylinder 121 is formed from separate upstream and downstream parts. The upstream part (hereinafter referred to as "upstream storage cylinder") 1211 stores the first oxidation catalyst 31. The downstream part (hereinafter referred to as "downstream storage cylinder") 1212 has a cylindrical shape formed by welding a flat sheet of steel such that weld beads are formed on the internal and external surfaces of a joining portion j2 in order to ensure joining strength. In the second embodiment, an injection nozzle 4 is protruded through a pipe wall and inserted into the downstream storage cylinder 1212. The downstream storage cylinder 1212 and a later-described pored ring 25 form "a passage member" according to the second embodiment.

An exhaust inlet pipe 123 is passed through a front wall 111a of the muffler housing 111 and inserted in the axial direction. A plurality of exhaust distribution holes 123h are formed in the leading end of the exhaust inlet pipe 123 over the entire circumference. Such an exhaust inlet pipe 123 is connected to an upstream exhaust pipe 21 by a flange formed at one end of the exhaust inlet pipe 123. Consequently, an exhaust passage situated upstream of the catalytic muffler 101 communicates with the expansion chamber r1 via the exhaust distribution holes 123h. On the other hand, an exhaust outlet pipe 124 is disposed to pierce through the front wall 111a and expansion chamber r1 of the muffler housing 111 and is inserted in the axial direction. Consequently, the small chamber r3 and an exhaust conduit situated downstream of the catalytic muffler 101 communicate via an opening 124a made in the exhaust outlet pipe 124.

Figure 5:
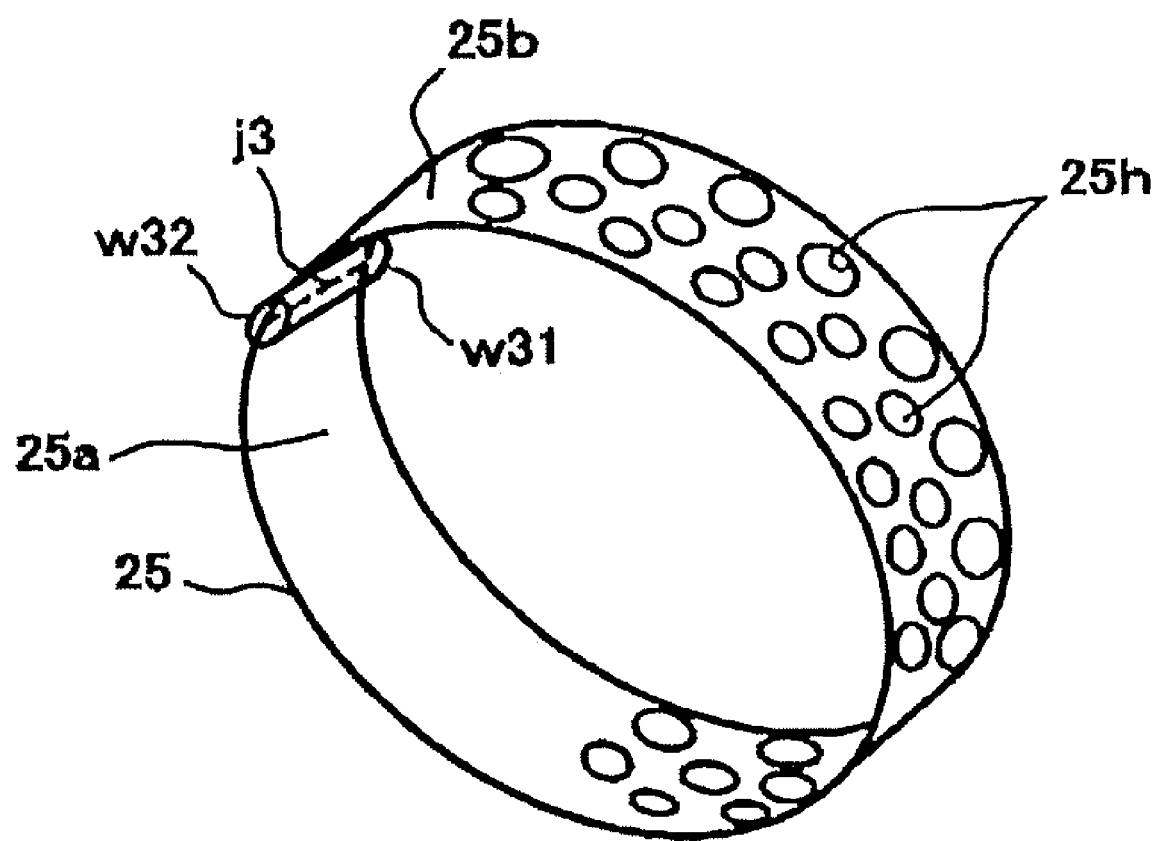
FIG. 5 is a pored ring as a "passage member" according to the second embodiment.

Additionally, in the second embodiment, the pored ring 25 mentioned above is provided to form the "passage member" of the second embodiment together with the downstream storage cylinder 1212. The pored ring 25 is disposed in the return chamber r2 and adjacent to the downstream end of the first catalyst storage cylinder 121 such that one end of the pored ring 25 is against the rear wall 111b of the muffler housing 111. FIG. 5 shows the pored ring 25 viewed obliquely from above. The pored ring 25 is formed in a cylindrical shape by welding a flat sheet of steel, as described above, and has a plurality of exhaust distribution holes 25h in the shape of multi-pores over about a half of the circumference. In addition, in order to ensure joining strength in the joining portion j3, weld beads w31 and w32 are formed on the internal surface 25a and external surface 25b, respectively, of the pored ring 25.

Figure 4:
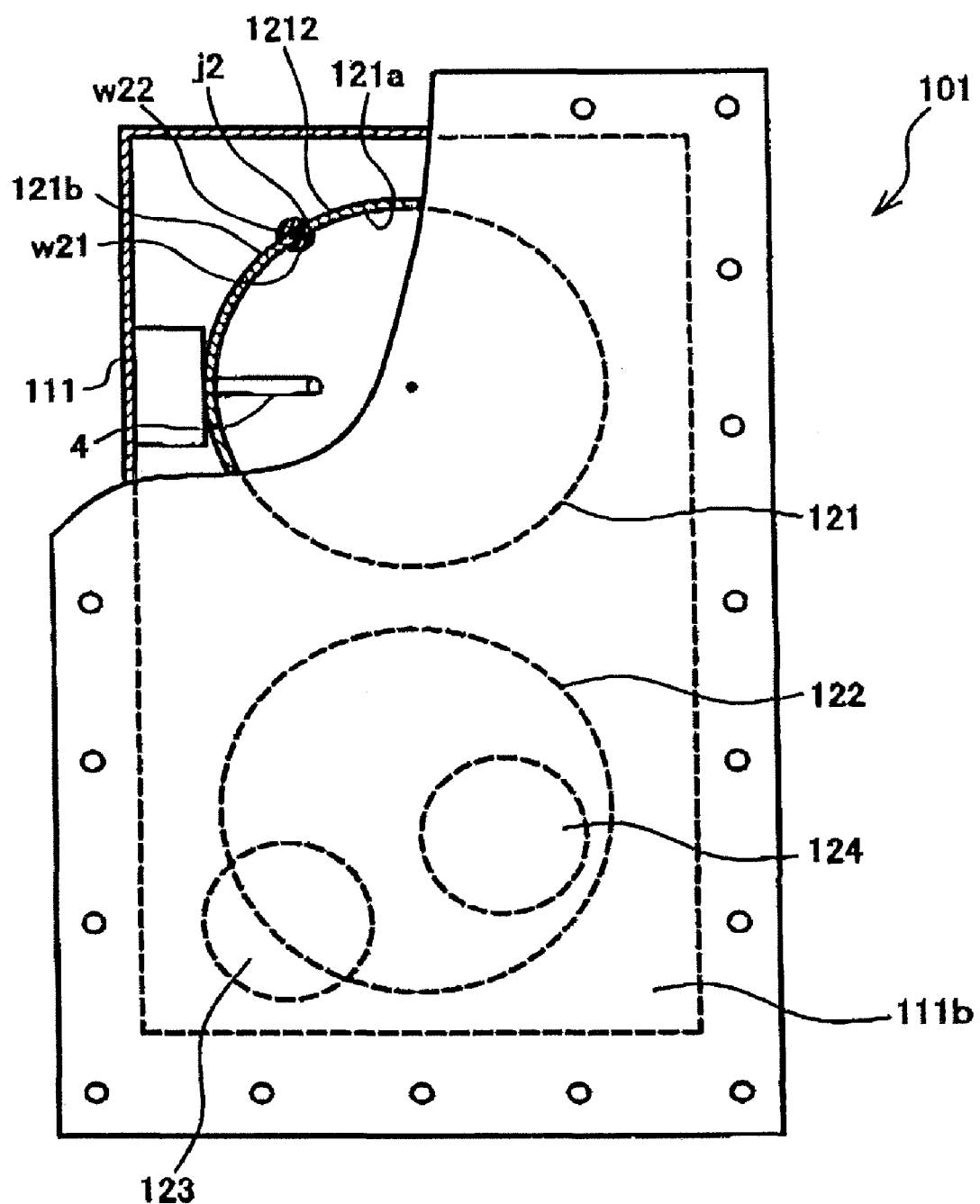
FIG. 4 is a partially exposed view of a catalytic muffler according to the second embodiment as viewed from the rear.

FIG. 4 is a partially exposed view of the catalytic muffler 101 viewed from the rear wall 111b side along the central axis AX2.

In the catalytic muffler 101, the downstream storage cylinder 1212 is disposed such that the internal surface of the joining portion j2 is disposed to overhang. Likewise, the pored ring 25 is disposed such that the internal surface of the joining portion j3 extends to overhang. In the second embodiment, these portion j2 and j3 are aligned on a single straight line (see FIG. 3). In addition, the exhaust distribution holes 25a are formed over almost half of the circumference of the pored ring 25, and unevenly distributed or scattered on one side of a straight line which connects the centers of the first and second catalyst storage cylinders 121 and 122 (i.e., in the second embodiment, opposite to the position where the injection nozzle 4 is disposed).

In the exhaust emission purification apparatus (i.e., catalytic muffler 101) having the foregoing configuration, the exhaust gas flowing into the expansion chamber r1 via the exhaust inlet pipe 123 circulates as indicated by arrows F1 through F7. To be specific, the exhaust gas flowing into the catalytic muffler 101 through the exhaust distribution holes 123h flows into the first catalyst storage cylinder 121 through the expansion chamber r1, thus passing through the first oxidation catalyst 31. The injection nozzle 4 adds a reducing agent, such as a urea water, to the exhaust gas that has thus passed through the first oxidation catalyst 31. After this addition of the reducing agent, the exhaust gas flows into the return chamber r2 through the exhaust distribution holes 25h of the pored ring 25. Further, the exhaust gas flows into the second catalyst storage cylinder 122 from the return chamber r2, passes through the reduction catalyst 3 and second oxidation catalyst 32, and is exhausted into the atmosphere from the small chamber r3 via the exhaust outlet pipe 124. In the second catalyst storage pipe 122, NOx in the exhaust gas is purified by the reduction catalyst 3, and also the reducing agent that has passed through the reduction catalyst 3 is purified by the second oxidation catalyst 32.

As in the first embodiment, the second embodiment facilitates the installation of the injection nozzle 4 and saves on production cost of the members 1212 and 25 as "passage members".

Additionally, this makes it possible for gravity to prevent the reducing agent fallen on each joining portion j2, j3 along the pipe walls from staying on the weld bead w1, with the result that the reducing agent constituents are prevented from depositing in each joining portion j2, j3, and from forming an accumulation of the reducing agent constituents in the exhaust passage 2.

In particular, according to the second embodiment, provision of the first oxidation catalyst 31 in addition to the reduction catalyst 3 enables more efficient NOx reduction, and provision of the second oxidation catalyst 32 prevents the reducing agent that has passed through the reduction catalyst 3 from being exhausted into the atmosphere without being purified.

Further, according to the second embodiment, the exhaust purification catalysts 3, 31, 32 are accommodated in the muffler housing 111 to constitute the catalytic muffler 101, so that the latter 101 may operate as a catalytic converter-cum-silencer. Accordingly, the exhaust emission purification apparatus can be configured as a unit and yields a satisfactory effect in muffling the exhaust noise.

The descriptions of the first and second embodiments have been given exemplifying the case where cylindrical "passage members" have a circular cross-section. However, the present invention is not limited thereto but passage members of an oval or rectangular cross-section may be equally applicable. In particular, in the case where passage members of a rectangular cross section are used, the direction of each passage member is set so that the joining portion is located on a wall surface that forms one side of the cross section higher than its center axis (i.e., upper wall if the upper wall is set horizontal).

In addition, a urea water is utilized as a reducing agent. It should be noted that the present invention is not limited to this but any reducing agents, the constituents of which might cause deposition by the exhaust heat, can be employed.

In the above description, the present invention has been described based on the preferred embodiments. However, the scope of the present invention is not limited to this description, and is determined based on the disclosure in the scope of claims in accordance with applied articles of the patent law.

We claim:

1. An exhaust emission purification apparatus for an engine, comprising:
   a reduction catalyst disposed in an exhaust passage of the engine;
   an addition device for adding a NOx reducing agent into the exhaust gas of the engine, the addition device including an injection nozzle disposed in the exhaust passage at a position upstream of the reduction catalyst, the addition device for injecting the NOx reducing agent via the injection nozzle; and
   a passage member interposed in the exhaust passage, the passage member forming an internal circumferential surface of at least a part of the exhaust passage between the injection nozzle and the reduction catalyst,
   wherein the passage member is joined by welding in an axial direction of the passage member into a hollow shape with the internal circumferential surface, and is disposed in the exhaust passage in a situation where the welding portion is located on the internal circumferential surface at a position where a normal line of the internal circumferential surface that is drawn at said position inclines vertically downward with respect to a horizontal direction extending from said position,
   wherein the passage member comprises, in the welding portion, a weld bead swelling on the internal circumferential surface.

2. The exhaust emission purification apparatus for an engine according to claim 1, wherein the passage member is rectangular in cross section.

3. The exhaust emission purification apparatus for an engine according to claim 1,
   wherein the welding portion is disposed vertically higher than a central axis of the passage member.

4. The exhaust emission purification apparatus for an engine according to claim 1, further comprising:
   a first oxidation catalyst disposed in the exhaust passage at a position upstream of the injection nozzle; and
   a second oxidation catalyst for treating the reducing agent, the second oxidation catalyst being disposed at a position downstream of the reduction catalyst.

5. The exhaust emission purification apparatus for an engine according to claim 1, further comprising a urea water tank for storing a urea water as the reducing agent, the urea water tank being connected to the addition device.

6. An engine comprising: an engine body having a combustion chamber; and the exhaust emission purification apparatus according to claim 1, the apparatus being disposed in an exhaust system of the engine.

7. The exhaust emission purification apparatus for an engine according to claim 1, wherein the passage member is cylindrical.

8. The exhaust emission purification apparatus for an engine according to claim 7, wherein the passage member is oval in cross section.

9. The exhaust emission purification apparatus for an engine according to claim 1, further comprising:
   an oxidation catalyst disposed in the exhaust passage at a position upstream of the injection nozzle; and
   a NOx reduction catalyst as the reduction catalyst, disposed at a position downstream of the injection nozzle,
   wherein the passage member has a plurality of exhaust distribution holes arranged in a circumferential direction of the passage member and is disposed between the injection nozzle and the reduction catalyst substantially concentric with the oxidation catalyst.

10. The exhaust emission purification apparatus for an engine according to claim 9, further comprising:
    a muffler housing for accommodating therein the oxidation catalyst and the reduction catalyst, the inside of the muffler housing being divided into a first muffling chamber, a second muffling chamber, and an intermediate chamber located between the first and second muffling chambers, by a plurality of partitions perpendicular to the axial direction,
    wherein an exhaust passage arranged upstream of the muffler housing is inserted in the muffler housing in the axial direction, thereby communicating with the first muffling chamber,
    the oxidation catalyst is accommodated in a first catalyst storage cylinder disposed in the intermediate chamber on one side with respect to a central axis of the muffler housing so as to allow a communication between the first and second muffling chambers,
    the reduction catalyst is accommodated in a second catalyst storage cylinder disposed in the intermediate chamber on the other side with respect to the central axis so as to be connected with the second muffling chamber,
    the passage member is disposed concentric with the oxidation catalyst in the second muffling chamber, and
    an exhaust passage downstream of the muffler housing is inserted into the muffler housing to pass through the first muffling chamber in the axial direction, and thereby communicating with the second muffling chamber via the second catalyst storage cylinder.

11. An exhaust emission purification apparatus for an engine, comprising:
    reduction means for reducing NOx in an exhaust gas of the engine;
    addition means for adding a NOx reducing agent to the exhaust gas at a position upstream of the reduction means; and
    passage formation means for forming at least a part of an exhaust passage between the addition means and the reduction means,
    wherein the passage formation means is joined by a welding portion in an axial direction of this means into a hollow shape with an internal circumferential surface along which the exhaust gas and the added reducing agent are guided toward the reduction means, and the passage formation means is disposed in the exhaust passage in a situation where the welding portion is located on the internal circumferential surface in a position where the internal circumferential surface of this means extends to overhang,
    wherein the passage formation means comprises, in the welding portion, a weld bead swelling on the internal circumferential surface.

12. A method for supplying a NOx reducing agent to a reduction catalyst disposed in a passage for an exhaust gas containing NOx, the method comprising the steps of:

adding the reducing agent into the exhaust gas at a position upstream of the reduction catalyst; and introducing the added reducing agent into the reduction catalyst via a passage member which forms an internal circumferential surface of at least a part of an exhaust passage extending upstream of the reduction catalyst, wherein the passage member is joined by a welding portion in an axial direction of the passage member into a hollow shape with the internal circumferential surface, and is disposed in the exhaust passage in a situation where the welding portion is located on the internal circumferential surface in a position where the internal circumferential surface of the passage member overhang, wherein the passage member comprises, in the welding portion, a weld bead swelling on the internal circumferential surface.

* * * * *

UNITED STATES PATENT AND TRADEMARK OFFICE
CERTIFICATE OF CORRECTION

PATENT NO. : 8,181,446 B2
APPLICATION NO. : 11/941889
DATED : May 22, 2012
INVENTOR(S) : Koutarou Honda et al.

Page 1 of 1

It is certified that error appears in the above-identified patent and that said Letters Patent is hereby corrected as shown below:

IN THE TITLE PAGE:

(73) Assignee: Please add --Tokyo Roki Co., Ltd., Kanagawa (JP)--

Signed and Sealed this
Twelfth Day of February, 2013

Teresa Stanek Rea
*Acting Director of the United States Patent and Trademark Office*

UNITED STATES PATENT AND TRADEMARK OFFICE
CERTIFICATE OF CORRECTION

PATENT NO.         : 8,181,446 B2
APPLICATION NO.    : 11/941889
DATED              : May 22, 2012
INVENTOR(S)        : Koutarou Honda et al.

It is certified that error appears in the above-identified patent and that said Letters Patent is hereby corrected as shown below:

IN THE CLAIMS:

In Claim 12 at Column 10, Line 5:    Please insert --extends to-- after "member"

Signed and Sealed this
Twenty-seventh Day of May, 2014

Michelle K. Lee
*Deputy Director of the United States Patent and Trademark Office*